United States Patent [19]

Baggett

[11] 4,059,566
[45] Nov. 22, 1977

[54] PROCESS FOR CONTROLLING THE MOLECULAR WEIGHT OF POLYCARBONATES USING AMMONIA OR AMMONIA COMPOUNDS

[75] Inventor: Joseph McClendon Baggett, Freeport, Tex.

[73] Assignee: The Dow Chemical Company, Midland, Mich.

[21] Appl. No.: 704,151

[22] Filed: July 12, 1976

[51] Int. Cl.$^2$ ............................................. C08G 63/62
[52] U.S. Cl. ................................ 260/47 XA; 260/463
[58] Field of Search ............. 260/47 XA, 77.5 D, 463

[56] References Cited

U.S. PATENT DOCUMENTS

| 3,028,365 | 4/1962 | Schnell et al. | 260/47 XA |
| 3,215,668 | 11/1965 | Rissinger et al. | 260/47 XA |
| 3,223,678 | 12/1965 | Bolgiano | 260/47 XA |

*Primary Examiner*—Theodore E. Pertilla
*Attorney, Agent, or Firm*—Benjamin G. Colley

[57] ABSTRACT

Process for the preparation of aromatic polycarbonates by the interfacial technique wherein the molecular weight is controlled by adding an effective amount of ammonia or ammonium compounds to the polymerization reaction. Examples of suitable compounds effective to control the molecular weight are ammonia, ammonium hydroxide, ammonium sulfite and other ammonium salts.

5 Claims, No Drawings

PROCESS FOR CONTROLLING THE MOLECULAR WEIGHT OF POLYCARBONATES USING AMMONIA OR AMMONIA COMPOUNDS

BACKGROUND OF THE INVENTION

This invention relates to a method of controlling the molecular weight of polycarbonates prepared by the interfacial technique by adding ammonia or ammonium compounds to the reaction media.

It is known from U.S. Pat. No. 3,028,365 that in the interfacial polymerization process to make aromatic polycarbonates from dihydric phenols and phosgene the use of small amounts of monohydric phenols will control the molecular weight of the polycarbonates.

It is further known from Ser. No. 661,672 filed Feb. 26, 1976 that small amounts of metallic sulfites are effective to control the molecular weight of polycarbonates during their formation.

SUMMARY OF THE INVENTION

It now has been discovered that the molecular weight of thermoplastic aromatic polycarbonates can be controlled in process for preparing these under interfacial polycarbonate forming conditions wherein the following are reacted:

1. a carbonyl halide,
2. a dihydric phenol or mixture of dihydric phenols,
3. a catalyst useful to form polycarbonates and
4. a chain terminating amount of a compound selected from the group consisting of ammonia or an ammonium compound which liberates ammonia under the conditions of the reaction.

The process is thus useful to make thermoplastic polycarbonates without the need for the known organic chain terminators such as tertiary butyl phenol and phenol. The polycarbonates prepared can have almost any molecular weight but preferably have a weight average molecular weight range from about 5,000 to about 60,000 as measured by gel permeation chromatography.

DETAILED DESCRIPTION

The process of this invention is carried out by first reacting and stirring a dihydric phenol compound such as bisphenol A with an aqueous caustic solution made from sodium or potassium hydroxide having a pH greater than 9 and preferably in the pH range from 9-13 wherein the aqueous solution contains a chain terminating amount of a compound selected from the group consisting of ammonia or an ammonium compound which liberates ammonia under the conditions of the reaction.

A catalytic quantity, i.e., about 0.5 to about 2.0 weight percent based on the dihydric phenol of a polycarbonate catalyst such as a quaternary amine or a tertiary amine catalyst is then added to the reactants together with 5-10 moles of a halogenated solvent such as methylene chloride. Suitable catalysts are triethylamine, N,N-dimethylcyclohexylamine, tetramethyl ammonium hydroxide, triethyl benzyl ammonium hydroxide, benzyl trimethyl ammonium chloride and the like.

The catalyzed reactants are stirred and allowed to react for about 0.25 to about 3 hours at a temperature of about 20° to about 40° C.

For the purpose of this invention, a chain terminating amount of the above ammonia or ammonium compounds is defined as from about 0.5 to about 10.0 weight percent ammonia or ammonium compounds based on the weight of the dihydric phenol. Preferably this range is from about 1.0 to about 7.0 weight percent.

The chain terminating compound of this invention have one of the formulas $NH_3$, $NH_4Z$ or $(NH_4)_2Z_2$ wherein Z is a monovalent inorganic anion such as the chloride, hydroxide or nitrate anions and $Z_2$ is a divalent inorganic anion such as the sulfite, carbonate, sulfate or hydrogen phosphite anion.

Suitable chain terminating compounds within the scope of this invention are exemplified by ammonia, ammonium hydroxide, ammonium carbonate, ammonium sulfite, ammonium chloride, ammonium phosphate, ammonium sulfate, ammonium nitrate and the like.

The dihydric phenols employed in the practice of this invention are known dihydric phenols in which the sole reactive groups are the two phenolic hydroxyl groups. Some of these are represented by the general formula

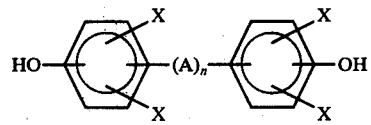

wherein A is a divalent hydrocarbon radical containing 1-15 carbon atoms, $$-S-, \quad -S-S-, \quad -\overset{O}{\underset{O}{S}}-, \quad -\overset{O}{S}-, \quad -O- \text{ and } -\overset{O}{C}-,$$

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons and an oxyaryl group of 6-8 carbons and n is 0 or 1.

One group of suitable dihydric phenols are those illustrated below:

1,1-bis(4-hydroxyphenyl)-1-phenyl ethane
1,1-bis(4-hydroxyphenyl)-1,1-diphenyl methane
1,1-bis(4-hydroxyphenyl) cyclooctane
1,1-bis(4-hydroxyphenyl) cycloheptane
1,1-bis(4-hydroxyphenyl) cyclohexane
1,1-bis(4-hydroxyphenyl) cyclopentane
2,2-bis(3-propyl-4-hydroxyphenyl) decane
2,2-bis(3,5-dibromo-4-hydroxyphenyl) nonane
2,2-bis(3,5-isopropyl-4-hydroxyphenyl) nonane
2,2-bis(3-ethyl-4-hydroxyphenyl) octane
4,4-bis(4-hydroxyphenyl) heptane
3,3-bis(3-methyl-4-hydroxyphenyl) hexane
3,3-bis(3,5-dibromo-4-hydroxyphenyl) hexane
2,2-bis(3,5-difluoro-4-hydroxyphenyl) butane
2,2-bis(4-hydroxyphenyl)propane (Bis A)
1,1-bis(3-methyl-4-hydroxyphenyl) ethane
1,1-bis(4-hydroxyphenyl) methane.

Another group of dihydric phenols useful in the practice of the present invention include the dihydroxyl diphenyl sulfoxides such as for example:

bis(3,5-diisopropyl-4-hydroxyphenyl) sulfoxide bis(3-methyl-5-ethyl-4-hydroxyphenyl) sulfoxide
bis(3,5-dibromo-4-hydroxyphenyl) sulfoxide
bis(3,5-dimethyl-4-hydroxyphenyl) sulfoxide
bis(3-methyl-4-hydroxyphenyl) sulfoxide
bis(4-hydroxyphenyl) sulfoxide.

Another group of dihydric phenols which may be used in the practice of the invention includes the dihydroxaryl sulfones such as, for example:

bis(3,5-diisopropyl-4-hydroxyphenyl) sulfone
bis(3-methyl-5-ethyl-4-hydroxyphenyl) sulfone
bis(3-chloro-4-hydroxyphenyl) sulfone
bis(3,5-dibromo-4-hydroxyphenyl) sulfone
bis(3,5-dimethyl-4-hydroxyphenyl) sulfone
bis(3-methyl-4-hydroxyphenyl) sulfone
bis(4-hydroxyphenyl) sulfone.

Another group of dihydric phenols useful in the practice of the invention includes the dihydroxydiphenyls:

3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:

bis(3-chloro-5-methyl-4-hydroxyphenyl) ether
bis(3,5-dibromo-4-hydroxyphenyl) ether
bis(3,5-dichloro-4-hydroxyphenyl) ether
bis(3-ethyl-4-hydroxyphenyl) ether
bis(3-methyl-4-hydroxyphenyl) ether
bis(4-hydroxyphenyl) ether.

A further group of dihydric phenols outside the scope of the above generic formula which may be used in the practice of the invention includes the dihydroxy benzenes, and the halo- and alkylsubstituted dihydroxy benzenes, such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromine, carbonyl chloride and carbonyl fluoride.

The recovery of the polycarbonate is accomplished by decanting the aqueous layer, treating the remaining halogenated solvent with a strong aqueous acid solution (pH 1-3) such as hydrochloric or sulfuric acid solution, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

EXAMPLES 1-14

Into a 2.0 liter flask fitted with stirrer, thermometer, sparger tube, and reflux condenser, were charged the following: 75 grams para-bisphenol A, 2.0 grams ammonium sulfite, and 276 grams of distilled water. The contents were stirred and nitrogen purged for about 5 minutes at 25° C. Then, 34 ml of a caustic solution was added. The caustic solution contained 37.5 grams of 98.8% sodium hydroxide pellets in 69.7 grams of distilled water and had a volume of 71 milliliters. The contents were allowed to stir, with a slight $N_2$ purge, for 5 minutes, at which point 214 milliliters of methylene chloride were added with continual stirring at 25° C. The catalyst, 0.4 milliliter of triethylamine was added, along with 0.05 gram of phenolphthalein indicator. The flask was partly submerged in a cold water bath as an aid for control of the reaction temperature, then phosgenation carried out at a rate of about 1.4 grams per minute.

Phosgene gas was fed in at a reaction temperature of 25° C and when the phenolphthalein color change occurred, 14 milliliters of caustic solution were added with continued phosgenation. The 14 milliliters caustic additions were made two more times. A final addition of 5.0 milliliters of caustic at the color change was made with continued phosgene addition until a total of about 42 grams phosgene had been fed in.

The contents were allowed to stir and digest at 25° C for 30 minutes. The stirrer, at this point, was stopped, allowing the reactants to phase out into two layers. The top layer being the salt water and excess caustic, had a pH of about 9.0 measured by pH paper. The heavy layer contained the methylene chloride polymer solution plus some water. The top layer was siphoned off, additional water was added, stirred, then siphoned off again. The polymer solution was acidified with HCl then diluted with additional methylene chloride so that better agitation could be obtained, then transferred to a separatory funnel for 12 hours. At this point, the polymer solution was almost clear.

This solution was filtered through diatomaceous earth, resulting in a clear colorless solution which was precipitated in N-hexane to remove the white polycarbonate particles. The polymer was filtered and dried in a vacuum oven at 110° C for 8 hours. The dried polymer was molded in a press at 600° F resulting in a tough high impact type, clear, plastic.

Following the procedures set forth above, the control and examples set forth in Table I were prepared.

TABLE I

| Example | Grams Terminator | Ammonium (Am) Salt Terminator | Weight Average Mol. Wt. (G.P.C.) |
|---|---|---|---|
| Control | 0 | none | >100,000 |
| 1 | 2.0 | (Am sulfite) | 28,033 |
| 2 | 3.5 | (Am sulfite) | 14,703 |
| 3 | 7.0 | (Am sulfite) | 4,980 |
| 4 | 1.8 | (Am carbonate) | 31,982 |
| 5 | 1.0 | (Am chloride) | 45,499 |
| 6 | 1.4 | (Am chloride) | 32,552 |
| 7 | 1.8 | (Am chloride) | 16,815 |
| 8 | 2.5 | (Am chloride) | 17,086 |
| 9 | 4.5 | (Am hydroxide) (28 weight %) | 19,058 |
| 10 | 5.3 | (Am hydroxide) (28 weight %) | 10,633 |
| 11 | 7.0 | (Am hydroxide) (28 weight %) | 6,842 |

TABLE I-continued

| Example | Grams Terminator | Ammonium (Am) Salt Terminator | Weight Average Mol. Wt. (G.P.C.) |
|---|---|---|---|
| 12 | 1.8 | (Am phosphate) | 31,721 |
| 13 | 1.8 | (Am sulfate) | 20,563 |
| 14 | 1.6 | (Am nitrate) | 42,435 |

EXAMPLE 15

Following the procedures set forth in Examples 1-14, 1.2 grams of ammonia gas is sparged into the aqueous solution of para-bisphenol A. A low molecular weight polycarbonate is obtained similar to that of Example 9.

The foregoing examples show that the ammonia compounds of this invention unexpectedly are able to control the molecular weight of polycarbonates when used during the preparation thereof. The terminal groups of the polycarbonates prepared by the method of this invention rather than being terminated by hydroxyl end groups are believed to be terminated by carbamate end groups to a large extent.

I claim:

1. A process for controlling the molecular weight of thermoplastic aromatic polycarbonates which comprises reacting under interfacial polycarbonate-forming conditions
   1. a carbonyl halide,
   2. a dihydric phenol or mixtures of dihydric phenols,
   3. a catalyst useful to form polycarbonates, and
   4. a chain terminating amount of a compound selected from the group consisting of ammonia or an ammonium compound which liberates ammonia under the conditions of the reaction.

2. The process as set forth in claim 1 wherein the amount of chain terminator compound used is such that the weight percent range of the chain terminator compound based on the weight of dihydric phenol is from about 0.5 to about 10.0.

3. A process for controlling the molecular weight of thermoplastic polycarbonates which comprises reacting under interfacial polycarbonate-forming conditions
   1. a carbonyl halide,
   2. a dihydric phenol or mixtures of dihydric phenols,
   3. a catalyst useful to form polycarbonates, and
   4. a chain terminating amount of a compound having one of the formulas
      a. $NH_3$,
      b. $NH_4Z$, or
      c. $(NH_4)_2Z_2$ wherein Z is a monovalent inorganic anion, and $Z_2$ is a divalent inorganic anion.

4. The process as set forth in claim 3 wherein the chain terminating compound has the formula $NH_4Z$ wherein Z is selected from the group consisting of the chloride, hydroxide or nitrate anions.

5. The process as set forth in claim 3 wherein the chain terminating compound has the formula $(NH_4)_2Z_2$ wherein $Z_2$ is selected from the group consisting of the sulfite, carbonate, sulfate or hydrogen phosphite anions.

* * * * *